United States Patent
Okada et al.

(10) Patent No.: US 10,036,526 B2
(45) Date of Patent: Jul. 31, 2018

(54) LIGHT GUIDING LENS AND VEHICLE LIGHTING UNIT

(71) Applicants: HONDA MOTOR CO., LTD., Tokyo (JP); STANLEY ELECTRIC CO., LTD., Tokyo (JP)

(72) Inventors: Naoyuki Okada, Saitama (JP); Masato Nakaarai, Tochigi (JP)

(73) Assignees: HONDA MOTOR CO., LTD., Tokyo (JP); STANLEY ELECTRIC CO., LTD., Tokyo (JP)

( * ) Notice: Subject to any disclaimer, the term of this patent is extended or adjusted under 35 U.S.C. 154(b) by 97 days.

(21) Appl. No.: 15/171,435

(22) Filed: Jun. 2, 2016

(65) Prior Publication Data

US 2016/0356446 A1 Dec. 8, 2016

(30) Foreign Application Priority Data

Jun. 8, 2015 (JP) .................. 2015-115380

(51) Int. Cl.
| | |
|---|---|
| F21V 7/04 | (2006.01) |
| F21S 8/10 | (2006.01) |
| F21V 8/00 | (2006.01) |
| F21S 43/14 | (2018.01) |
| F21S 43/237 | (2018.01) |
| F21S 43/241 | (2018.01) |
| F21S 43/245 | (2018.01) |
| F21S 43/249 | (2018.01) |
| F21S 43/31 | (2018.01) |

(52) U.S. Cl.
CPC ........... *F21S 48/2237* (2013.01); *F21S 43/14* (2018.01); *F21S 43/237* (2018.01); *F21S 43/241* (2018.01); *F21S 43/245* (2018.01); *F21S 43/249* (2018.01); *F21S 43/315* (2018.01); *G02B 6/001* (2013.01)

(58) Field of Classification Search
USPC ........................................... 362/555
See application file for complete search history.

(56) References Cited

U.S. PATENT DOCUMENTS 6,854,869 B1 * 2/2005 Fernandez ............. A47C 7/725
297/184.17

FOREIGN PATENT DOCUMENTS

JP 2013-222540 A 10/2013

* cited by examiner

*Primary Examiner* — Rafferty Kelly
(74) *Attorney, Agent, or Firm* — Kenealy Vaidya LLP

(57) ABSTRACT

A light guiding lens and vehicle lighting unit are shown. According to one aspect, an elongated light guiding lens guides and emits light emitted from LEDs. The light guiding lens includes a first rod extension and a second rod extension connected with each other, and a flange protruding from the first rod extension. The flange includes a plurality of light incident portions to introduce light into the flange. The light incident portions guide light toward the first rod extension along a light guiding direction and lies in the direction toward the second rod extension, the light guiding direction defining an acute intersecting angle with the extending direction of the first rod extension. The first rod extension includes reflecting surfaces to internally reflect the light incident on the light incident portions and guided inside the flange.

10 Claims, 3 Drawing Sheets

LIGHT GUIDING LENS AND VEHICLE LIGHTING UNIT

BACKGROUND OF THE INVENTION

Field of the Invention

The present invention relates to an elongated rod light guiding lens, and a vehicle lighting unit including such a light guiding lens.

Description of Related Art

Elongated rod light guiding lenses (a so called light guiding rod) have been known that are used as vehicle lighting units mounted on vehicles. A typical vehicle lighting unit of this type includes a light guiding lens which is opposed to a light source, such as a light emitting diode (LED), at a longitudinal end face and introduces light through the end face into the light guiding lens to emit light from the light guiding lens.

The light incident surface of the light guiding lens in the vehicle lighting unit of this type is basically limited to one of the end faces. If the light guiding lens is required to emit light with increased intensity, the LED should be replaced with a high-power LED and, in some cases, a heatsink should be additionally provided. This induces rise in costs of the vehicle lighting unit.

In order to address this problem, a vehicle lighting unit disclosed in Japanese Laid-Open Patent Publication No. 2013-222540 is provided with an extension branched from a middle portion of a light guiding lens and an additional light source facing the end face of this extension. With this, it is possible to increase the intensity of light without needing to use the high-power LED and the light guiding lens can emit brighter light.

A vehicle lighting unit according to Japanese Laid-Open Patent Publication No. 2013-222540 mentioned above has, however, spot-like light emission in the extension part of the light guiding lens due to the light from an additionally installed light source, thus worsening lighting appearance.

SUMMARY OF THE INVENTION

It is an object of the present invention, which has been accomplished to solve the above problems, to provide a light guiding lens that can emit more intensive light without worsening lighting appearance and without an increase in cost, and also to provide a vehicle lighting unit including the light guiding lens.

According to an aspect of the present invention, there is provided an elongated light guiding lens guiding and emitting light emitted from a plurality of LEDs, the light guiding lens including: a first rod extension and a second rod extension connected with each other; and a flange protruding from the first rod extension, wherein the flange includes a plurality of light incident portions corresponding to the respective LEDs and introducing light emitted from the LEDs into the flange, the light incident portions are disposed at different sites in a crossing direction intersecting with an extending direction of the first rod extension at an acute angle, the light incident portions guide light emitted from the respective LEDs inside the flange toward the first rod extension along a light guiding direction which is perpendicular to the crossing direction and lies in the direction toward the second rod extension, the light guiding direction defining an acute intersecting angle with the extending direction of the first rod extension, and the first rod extension includes a plurality of reflecting surfaces to internally reflect the light incident on the light incident portions and guided inside the flange along the extension direction toward the second rod extension.

According to another aspect of the present invention, there is provided a vehicle lighting unit including: a plurality of LEDs; and the light guiding lens.

BRIEF DESCRIPTION OF THE DRAWINGS

The above and other objects, advantages, and features of the present invention will become more fully understood from the detailed description given hereinbelow and the appended drawings which are given by way of illustration only, and thus are not intended as a definition of the limits of the present invention, wherein.

DESCRIPTION OF THE PREFERRED EMBODIMENTS

Exemplary embodiments of the present invention will now be described with reference to the accompanying drawings.

Figure 1:
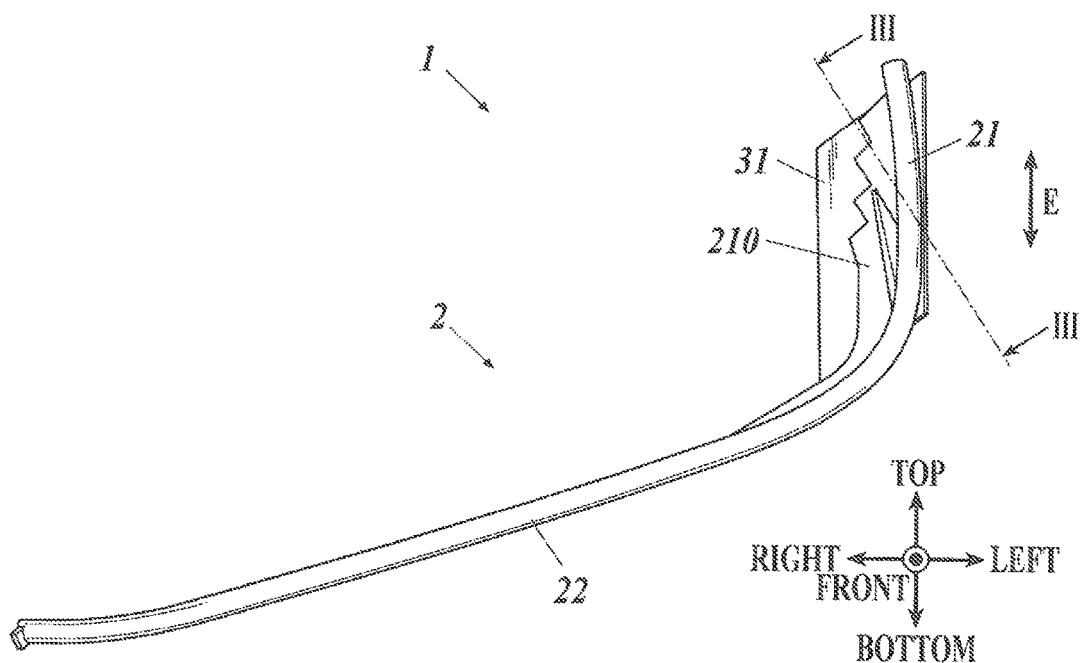
FIG. 1 is a front view of the main portion of a vehicle lighting unit in accordance with an embodiment.
Figure 2:
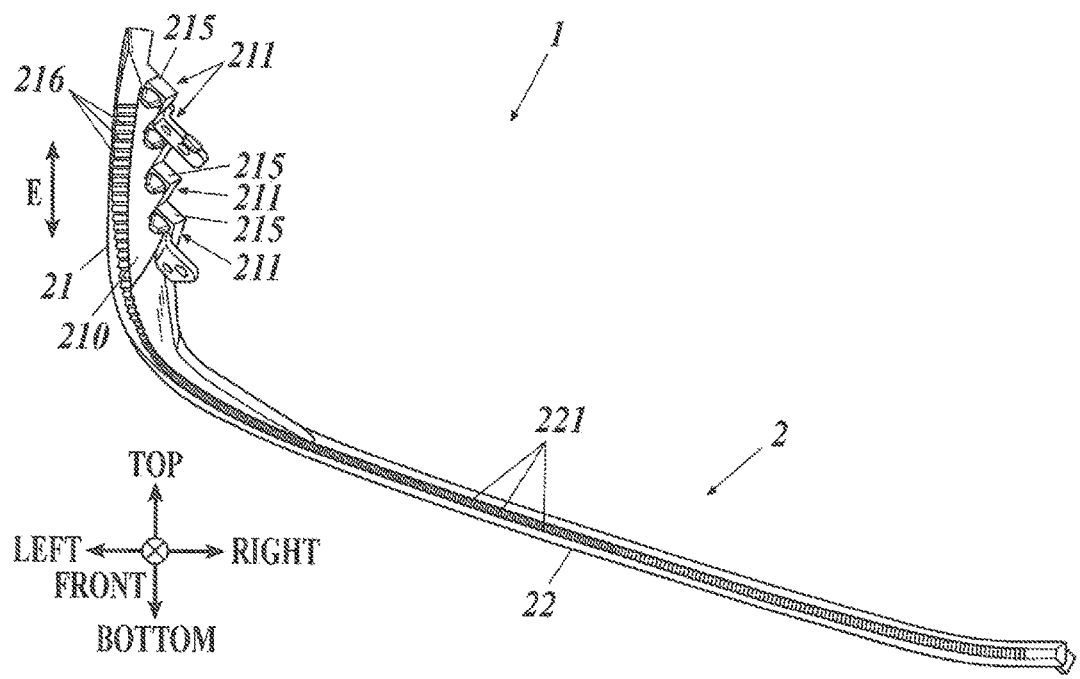
FIG. 2 is a rear view of the main portion of the vehicle lighting unit in accordance with the embodiment.
Figure 3:
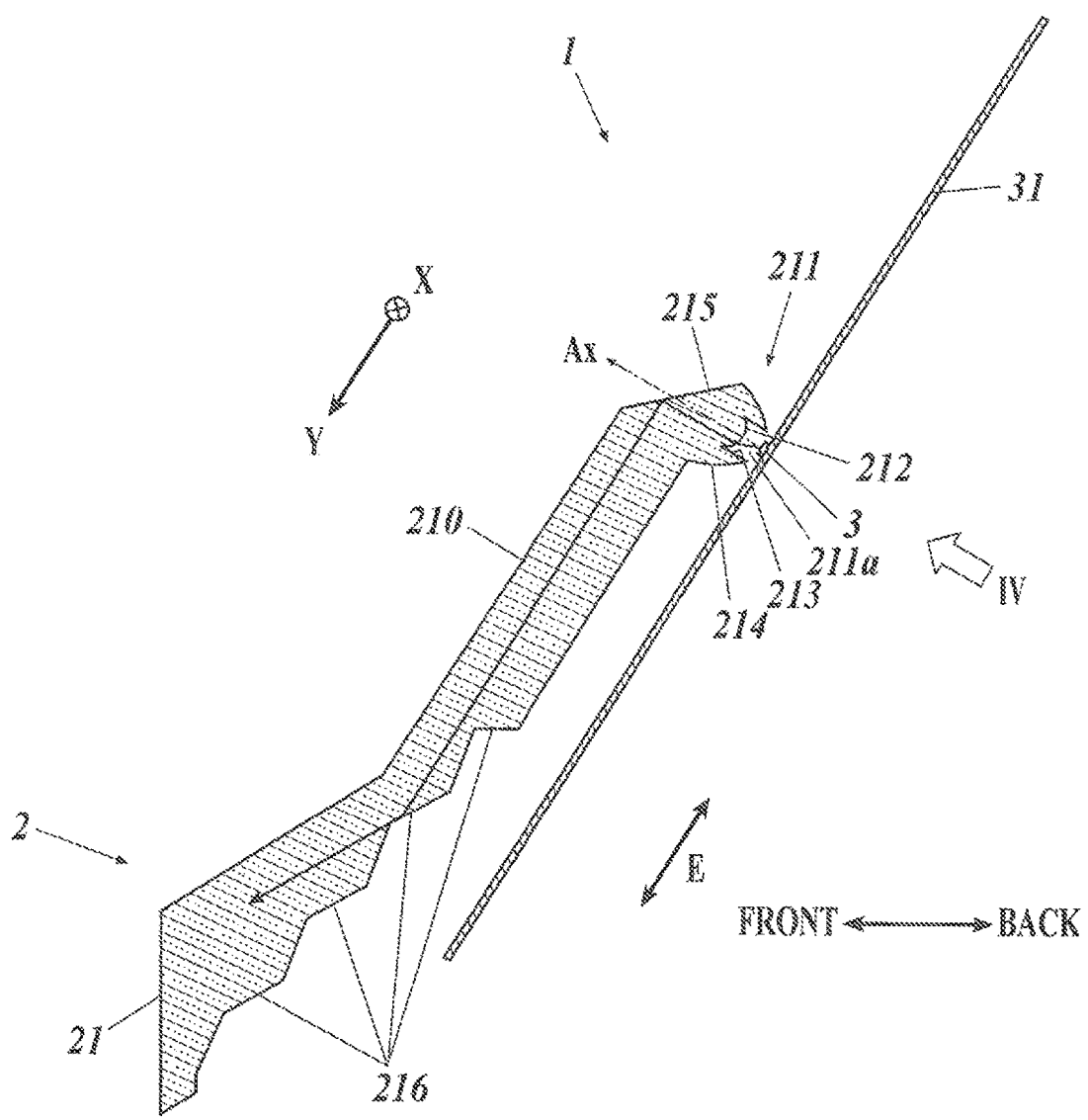
FIG. 3 is a cross-sectional view of the vehicle lighting unit along line III-III in FIG. 1.

FIGS. 1 and 2 are a front view and a rear view, respectively, of the main part of a vehicle lighting unit 1 in accordance with an embodiment of the present invention. FIG. 3 is a cross-sectional view of the vehicle lighting unit 1 along line III-III in FIG. 1, and FIG. 4 is a drawing of the vehicle lighting unit 1 viewed from the direction of the arrow IV of the FIG. 3.

Figure 4:
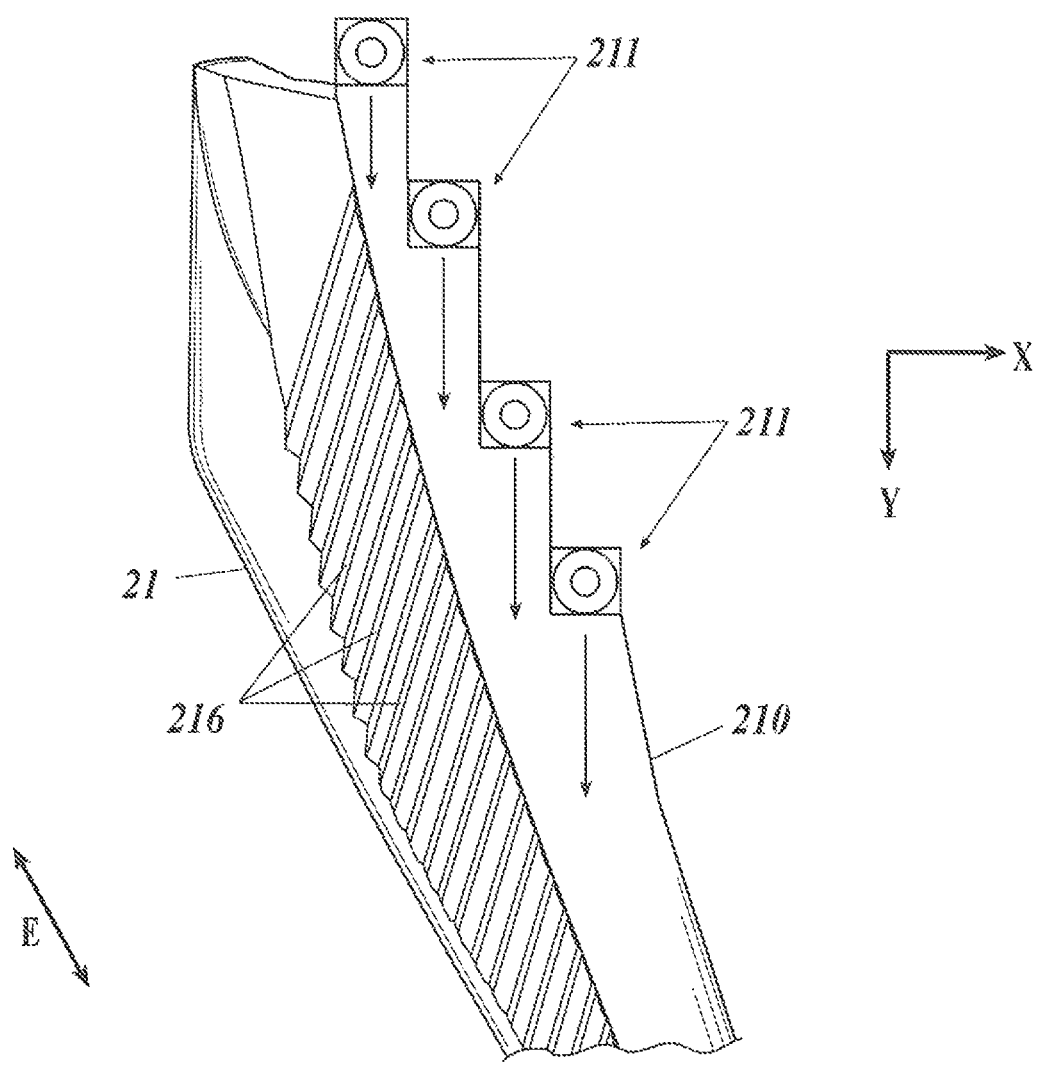
FIG. 4 is a drawing of the vehicle lighting unit viewed from the direction of the arrow IV of the FIG. 3.

In FIGS. 2 and 4, a plurality of LEDs 3 and a LED substrate 31 which are described later are not depicted. In the following description, terms "front," "back," "left," "right," "upper," and "lower" indicate directions viewed from the vehicle lighting unit 1 unless otherwise specified.

As shown in FIGS. 1 and 2, the vehicle lighting unit 1 is a front turn light to be installed to a vehicle (not depicted in the drawings), and is provided with a light guiding lens 2.

The light guiding lens 2 is an elongated light guiding rod, and guides light emitted from a plurality of LEDs 3 described below (see FIG. 3) and emits the guided light outward.

In detail, the light guiding lens 2 has a first rod extension 21 extending obliquely downward on the front side from a top end, and a second rod extension 22 smoothly connected to the lower end of the first rod extension 21.

The first rod extension 21 is provided with a planar flange 210 extending on the right from the top end through a bent portion adjoining the second rod extension 22.

The top end portion of the flange 210 has a multistep structure on the right (in more detail, the crossing axis X described below) and the step shifts downward as the top end portion of the flange 210 gets away from the first rod extension 21. On this multistep structure region, a plurality of (e.g. four in this embodiment) light incident portions 211 are disposed in parallel nearly along the extending direction E of the first rod extension 21. These light incident portions 211 are not necessarily nearly aligned to the extending direction E, as long as the light incident portions 211 have different crossing axes X intersecting with the extending direction E of the first rod extension 21 at an acute angle on the side facing the second rod extension 22.

These light incident portions 211 are disposed to correspond to a plurality of LEDs 3 (only one is illustrated in FIG. 3), which act as a light source for the vehicle lighting unit 1, as illustrated in FIGS. 3 and 4, and introduce the emitted light from the LEDs 3 to (the flange 210 of) the light guiding lens 2.

These LEDs 3 are arranged on the front surface of the single planar LED substrate 31 such that each optical axis Ax directed obliquely upward to the front direction to perpendicularly intersect with the extending direction E of the first rod extension 21.

In detail, the back part of each light incident portion 211 faces the corresponding LED 3 and has an axially symmetric, truncated cone shape protruding backward with the optical axis Ax of the LED 3 as a rotational symmetrical axis. A recess 211a is provided at the back end of the light incident portion.

A first incident surface 212 is provided on a bottom part of the recess 211a at a position where a first incident surface 212 having a convex (aspherical) shape extending backward faces the LED 3. The LED 3 is disposed at or near the focal point of the first incident surface 212. Accordingly, the light emitted from the LED 3 and incident on the first incident surface 212 enters the light incident portion 211 as substantially parallel light along the optical axis Ax.

The inner surface of the recess 211a acts as a second incident surface 213. This second incident surface 213 is a substantially truncated cone surface extending perpendicularly in the backward direction at a peripheral part of the first incident surface 212 so as to cover the entire perimeter of a front side of the LED 3. The second incident surface 213 introduces a light emitted from the LED 3 headed toward a lateral side of the first incident surface 212 into the light incident portion 211.

The outer peripheral surface of each light incident portion 211 acts as a reflecting surface 214 of the light incident portion. This reflecting surface 214 of the light incident portion is a tilted truncated cone surface extending outward from a leading end (back end) to the front part of the second incident surface 213, and internally reflects the incident light through the second incident surface 213 into the light incident portion 211 to form substantially parallel forwarding light rays along the optical axis Ax.

The front of each light incident portion 211 defines a first reflecting surface 215, where the front is positioned in front of the incident surface 212, the second incident surface 213, and the reflecting surface 214 of the light incident portion along the optical axis Ax. The first reflecting surface 215 is a plane tilted by approximately 45 degrees from the optical axis Ax toward the light guiding direction Y. The light guiding direction Y is parallel to the surface of the flange 210 and perpendicular to the crossing axis X, is directed to the second rod extension 22 (to the lower side) and intersects with the extending direction E of the first rod extension 21 at an acute angle.

This first reflecting surface 215 internally reflects (totally reflects) the light emitted from the corresponding LED 3 as a parallel light along the optical axis Ax entering the light incident portion 211 toward the first rod extension 21 along the light guiding direction Y.

The back surface of the first rod extension 21 is provided with a plurality of second reflecting surfaces 216. These second reflecting surfaces 216 are disposed substantially along the extending direction E while the second reflecting surfaces 216 and surfaces approximately parallel to the flange 210 are alternately disposed in the extending direction E. Moreover the width of the each second reflecting surface 216 decreases as the position of surface shifts downward.

These second reflecting surfaces 216 internally reflect (reflect totally) the light in the extending direction E toward the second rod extension 22, where the light is internally reflected at the first reflecting surface 215 in each of the light incident portions 211 and guided inside the flange 210.

The second rod extension 22 is a main light emitting part of the light guiding lens 2 where the light guided through the first rod extension 21 is emitted. The second rod extension 22 extends obliquely forward on the right side, and is smoothly curved and slightly descends from the lower end of the first rod extension 21. The back surface of this second rod extension 22 is provided with a plurality of lens cuts 221 at smaller intervals, connected to the second reflecting surfaces 216 of the first rod extension 21.

The second rod extension 22 directs and internally reflects the light guided through the first rod extension 21 with the lens cuts 221 along the longitudinal direction of the second rod extension 22. This light is emitted forward from the second rod extension 22; thus the second rod extension 22 can emit the light to the front direction.

In the vehicle lighting unit 1 of the present embodiment, the light emitted from the LEDs 3 enters the flange 210 of the light guiding lens 2 through the light incident portions 211 disposed at different sites in the flange in the crossing axis X at an acute angle to the extending direction E of the first rod extension 21. The light incident portions 211 then guide light emitted from the respective LEDs 3 toward the first rod extension 21 along the light guiding direction Y toward the second rod extension 22 in a direction perpendicular to the crossing axis X and intersecting with the extending direction E of the first rod extension 21 at an acute angle. This light is guided inside the flange 210 toward the first rod extension 21, and then internally reflected at the second reflecting surfaces 216 in the first rod extension 21 toward the second rod extension 22, and allows the second rod extension 22 to emit light.

The intensity of the light incident on the light guiding lens 2 can thus be increased without any extension in the midway of the light guiding lens 2 or any high power light source.

Accordingly, the light guiding lens 2 can emit more intensive light without worsening lighting appearance and without any cost increase.

Since the light incident portions 211 control the emitted light from the respective LEDs 3 into a parallel light beam and guide the light inside the flange 210 along the light guiding direction Y, the light beams from the LEDs 3 can be effectively distributed, resulting in a high utilization rate of the light.

Additionally, the LEDs 3 are aligned to an identical direction and implemented on a single planar LED substrate 31, a reduction in cost can be achieved compared to implementation of the LEDs 3 on individual substrates or on a flexible substrate.

Furthermore, the above described embodiment and variations thereof may be modified in various ways within the spirit or scope of the present invention.

For example, the vehicle lighting unit 1 of the present embodiment is described as a front turn light. The light guiding lens and the vehicle lighting unit according to the present invention is also applicable to vehicle lighting units other than the front turn light.

The entire disclosure of Japanese Patent Application No. 2015-115380 filed on Jun. 8, 2015 including description, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An elongated light guiding lens guiding and emitting light emitted from a plurality of LEDs, the light guiding lens comprising:
   a first rod extension and a second rod extension connected with each other; and
   a flange protruding from the first rod extension, wherein the second rod extension includes a light emitting surface,
   the first rod extension, the second rod extension, and the flange are formed as one,
   the first rod extension extends from a first end to the other end connected to the second rod extension, and the other end of the first rod extension is connected smoothly to one end of the second rod extension,
   the flange has a planar shape and projects out in a bent portion where the first rod extension and the second rod extension are connected,
   the flange includes a plurality of light incident portions corresponding to the respective LEDs and introducing light emitted from the LEDs into the flange,
   the light incident portions are disposed parallel along an extending direction of the first rod extension,
   the light incident portions are disposed at different sites in a crossing direction intersecting with an extending direction of the first rod extension at an acute angle,
   the first rod extension includes a plurality of second reflecting surfaces to internally reflect the light incident on the light incident portions and guided inside the flange along the extension direction toward the second rod extension, and
   the flange includes a first reflecting surface which internally reflects light from the corresponding LEDs entering the light incident portions toward the second reflecting surfaces to guide the light inside the flange.

2. The light guiding lens according to claim 1, wherein the light incident portions collimate the light emitted from the respective LEDs and guide the collimated light inside the flange along the light guiding direction.

3. A vehicle lighting unit comprising:
   a plurality of LEDs; and
   the light guiding lens according to claim 2.

4. The vehicle lighting unit according to claim 3, wherein the LEDs are aligned to an identical direction and implemented on a single planar LED substrate.

5. The vehicle lighting unit according to claim 4, wherein, the second reflecting surfaces have a width in which, compared to a side on the one end of the first rod extension, a side on the other end of the first rod extension is smaller.

6. A vehicle lighting unit comprising:
   a plurality of LEDs; and
   the light guiding lens according to claim 1.

7. The vehicle lighting unit according to claim 6, wherein the LEDs are aligned to an identical direction and implemented on a single planar LED substrate.

8. The vehicle lighting unit according to claim 7, wherein, the light incident portions are positioned on one surface side of the planar flange and face the LED substrate.

9. The vehicle lighting unit according to claim 7, wherein, the second reflecting surfaces have a width in which, compared to a side on the one end of the first rod extension, a side on the other end of the first rod extension is smaller.

10. The vehicle lighting unit according to claim 6, wherein, the second reflecting surfaces have a width in which, compared to a side on the one end of the first rod extension, a side on the other end of the first rod extension is smaller.

* * * * *